United States Patent
Kellogg (10) Patent No.: US 8,961,349 B2
(45) Date of Patent: Feb. 24, 2015

(54) DIFFERENTIAL WITH TAILORED TORQUE BIAS RATIOS

(75) Inventor: Philip R. Kellogg, Macomb, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 14/124,947

(22) PCT Filed: Jul. 6, 2012

(86) PCT No.: PCT/US2012/045663
§ 371 (c)(1),
(2), (4) Date: Dec. 9, 2013

(87) PCT Pub. No.: WO2013/006751
PCT Pub. Date: Jan. 10, 2013

(65) Prior Publication Data
US 2014/0121056 A1    May 1, 2014

Related U.S. Application Data (60) Provisional application No. 61/504,880, filed on Jul. 6, 2011.

(51) Int. Cl.
*F16H 13/06* (2006.01)
*F16H 48/22* (2006.01)
*F16H 48/285* (2012.01)

(52) U.S. Cl.
CPC .............. *F16H 48/22* (2013.01); *F16H 48/285* (2013.01)

USPC ............................................ 475/184; 475/226

(58) Field of Classification Search
USPC .................. 475/184, 226, 248, 249
See application file for complete search history.

(56) References Cited

U.S. PATENT DOCUMENTS

| | | | |
|---|---|---|---|
| 5,194,054 A | 3/1993 | Amborn et al. | |
| 5,342,256 A | 8/1994 | Amborn et al. | |
| 5,507,703 A | 4/1996 | Madsack et al. | |
| 5,620,389 A * | 4/1997 | Sato | 475/249 |
| 5,728,024 A | 3/1998 | Ishizuka et al. | |
| 5,728,025 A | 3/1998 | Ishikawa et al. | |
| 2010/0081535 A1 | 4/2010 | Gutsmiedl | |
| 2012/0077635 A1 * | 3/2012 | McVea et al. | 475/249 |

FOREIGN PATENT DOCUMENTS

| | | |
|---|---|---|
| DE | 40 13 202 A1 | 10/1991 |
| DE | 42 23 374 A1 | 1/1994 |
| EP | 0 408 173 A1 | 1/1991 |

OTHER PUBLICATIONS

International Search Report and Written Opinion for PCT/US2012/045663, mailed Dec. 10, 2012; ISA/EP.

* cited by examiner

*Primary Examiner* — Robert A Siconolfi
*Assistant Examiner* — Huan Le
(74) *Attorney, Agent, or Firm* — Harness, Dickey & Pierce, P.L.C.

(57) ABSTRACT

A differential with one or more friction and thrust washer sets so that axially generated thrust forces can be used in certain situations to affect a torque bias ratio of the differential.

19 Claims, 4 Drawing Sheets

DIFFERENTIAL WITH TAILORED TORQUE BIAS RATIOS

CROSS-REFERENCE TO RELATED APPLICATIONS

This application is a 371 U.S. National Stage of International Application No. PCT/US2012/045663, filed Jul. 6, 2012, and claims priority to U.S. Provisional Patent Application No. 61/504,880, filed Jul. 6, 2011, the disclosures of which are herein incorporated by reference in their entirety.

FIELD

The present disclosure relates to a differential with tailored torque bias ratios.

BACKGROUND

This section provides background information related to the present disclosure which is not necessarily prior art.

Helical-type differentials are commonly employed in drivetrains having a center differential. The helical-type differential is configured to limit the amount of rotary power that is transmitted to an axle with slipping wheels to thereby maintain the supply of rotary power to a non-slipping axle. One disadvantage of helical-type differentials concerns their cost. Accordingly, there remains a need in the art for an improved differential that may be employed as a center differential.

SUMMARY

In one form, the present teachings provide a differential having a differential case, first and second side gears, a plurality of first pinions, a plurality of second pinions, a first friction and thrust washer set, a second friction and thrust washer set, and a center friction and thrust washer set. The first and second side gears are received in the differential case. The first pinions are received in the differential case and meshingly engage the first side gear. The second pinions are received in the differential case and meshingly engage with the second side gear. Each of the plurality of second pinions meshingly engages an associated one of the first pinions. The first side gear has a pitch diameter that is smaller than a pitch diameter of the second side gear. The center friction and thrust washer set is received between the first and second side gears and abuts an inboard axial end of each of the plurality of first pinions. Each of the plurality of second pinions extends axially away from the second side gear past the center friction and thrust washer set. The first friction and thrust washer set is configured to control friction between the differential case and the first side gear, while the second friction and thrust washer set is configured to control friction between the differential case and the second side gear. The second friction and thrust washer set has a first friction control element, which is coupled to the differential case for rotation therewith, and at least one second friction control element that is coupled to the second side gear for rotation therewith. An outboard axial end of each of the plurality of first pinions and an outboard axial end of each of the plurality of second pinions directly contact the differential case.

In another form, the present teachings provide a differential having a differential case, first and second side gears, a plurality of first pinions, a plurality of second pinions and a center friction and thrust washer set that is received between the first and second side gears. The first and second side gears are received in the differential case. The first pinions are received in the differential case and meshingly engage with the first side gear. The second pinions are received in the differential case and meshingly engage with the second side gear. Each of the second pinions meshingly engages an associated one of the first pinions. The first side gear has a pitch diameter that is smaller than a pitch diameter of the second side gear. The center friction and thrust washer set abuts an inboard axial end of each of the plurality of first pinions. Each of the second pinions extends axially away from the second side gear past the center friction and thrust washer set.

In a further form, the present teachings provide a differential having a differential case, first and second side gears, a plurality of first pinions, a plurality of second pinions and first and second friction and thrust washer sets. The first pinions are received in the differential case and meshingly engage with the first side gear. The second pinions are received in the differential case and meshingly engage with the second side gear. Each of the second pinions meshingly engages an associated one of the first pinions. The first friction and thrust washer set is configured to control friction between the differential case and the first side gear, while the second friction and thrust washer set is configured to control friction between the differential case and the second side gear. An outboard axial end of each of the plurality of first pinions and an outboard axial end of each of the plurality of second pinions directly contact the differential case.

In still another form, the present teachings provide a differential having a differential case, first and second side gears, a plurality of first pinions, a plurality of second pinions and a first friction and thrust washer set. The first and second side gears are received in the differential case. The first pinions are received in the differential case and meshingly engage with the first side gear. The second pinions are received in the differential case and meshingly engage with the second side gear. Each of the plurality of second pinions meshingly engages an associated one of the first pinions. The second side gear has a pitch diameter that is smaller than a pitch diameter of the first side gear. The first friction and thrust washer set includes a first friction control element, which is coupled to the differential case for rotation therewith, and at least one second friction control element that is coupled to the first side gear for rotation therewith.

Further areas of applicability will become apparent from the description provided herein. It should be understood that the description and specific examples are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
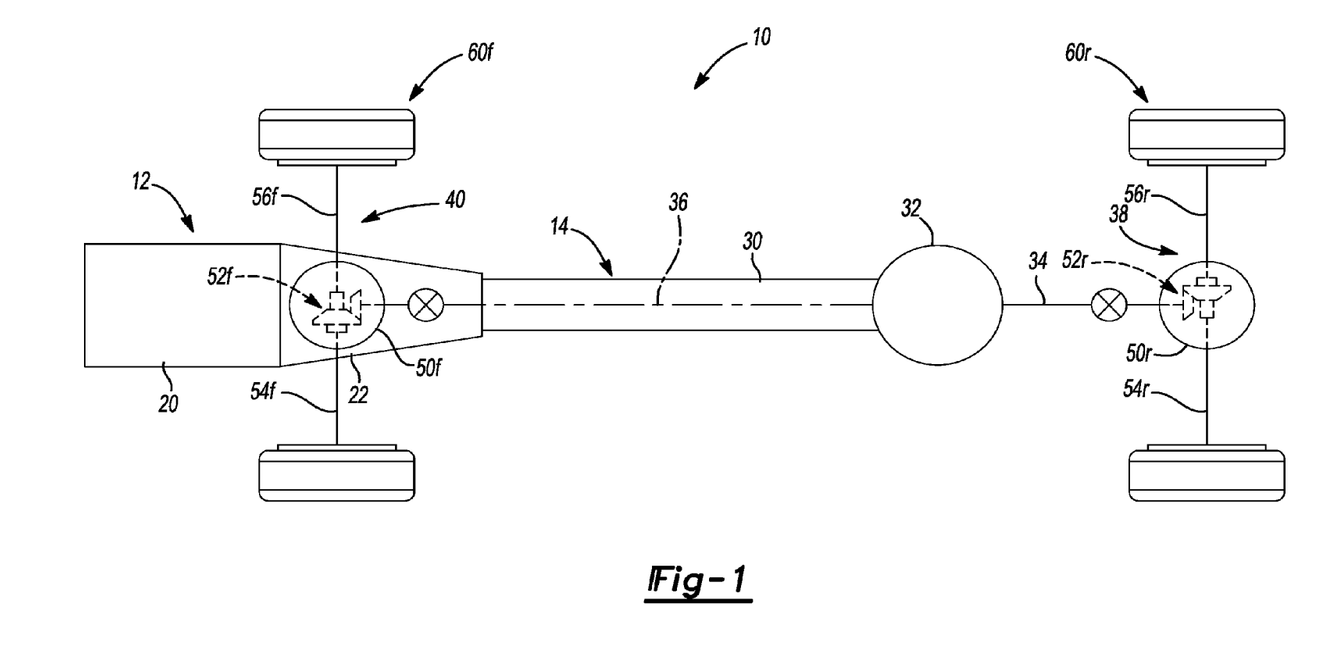
FIG. 1 is a schematic illustration of a vehicle constructed in accordance with the teachings of the present disclosure.

With reference to FIG. 1 of the drawings, a vehicle constructed in accordance with the teachings of the present disclosure is generally indicated by reference numeral 10. The vehicle 10 can comprise a power train 12 and a drive train 14 that can be employed to provide propulsive power to a set of front wheels 16 and a set of rear wheels 18. The power train 12 can be configured to output rotary power to the drive train 14 and can include any type of rotary power device 20, such as an electric motor, an internal combustion and combinations thereof. The output of the rotary power device 20 can be coupled to a transmission 22, which can be any type of transmission including a manual transmission, an automatic transmission or a variable speed transmission. It will be appreciated that while not shown, a clutch and/or torque converter could be employed to couple the output of the rotary power device 20 to an input of the transmission 22.

The drive train 14 can be coupled to receive rotary power from the transmission 22 and can comprise an input propeller shaft 30, a center differential 32, a rear output propeller shaft 34, a front output propeller shaft 36, a rear axle assembly 38 and a front axle assembly 40. The input propeller shaft 30 can be configured to transmit rotary power between an output member of the transmission and an input of the center differential 32, while the front and rear output propeller shafts 34 and 36 can be employed to transmit rotary power from the center differential 32 to the front and rear axle assemblies 38 and 40, respectively. The front and rear axle assemblies 38 and 40 can be generally similar in their construction and operation and as such, only the rear axle assembly 38 will be discussed in detail. Components of the front and rear axle assemblies 38 and 40 will be identified by similar reference numbers, except that the reference numbers associated with the components of the front axle assembly 40 will employ an "f" suffix and reference numbers associated with the components of the rear axle assembly 38 will employ an "r" suffix. The rear axle assembly 38 can include an axle housing 50r, a differential 52r that can be received in the axle housing 50r, and a pair of axle shafts 54r and 56r that can be employed to transmit rotary power between the differential 52r and the rear wheels 60r. The front output propeller shaft 36 can transmit rotary power between the center differential 32 and the differential 52f of the front axle assembly 40 (to thereby drive the front wheels 60f), while the rear output propeller shaft 34 can transmit rotary power between the center differential 32 and the differential 52r of the rear axle assembly 38.

Figure 2:
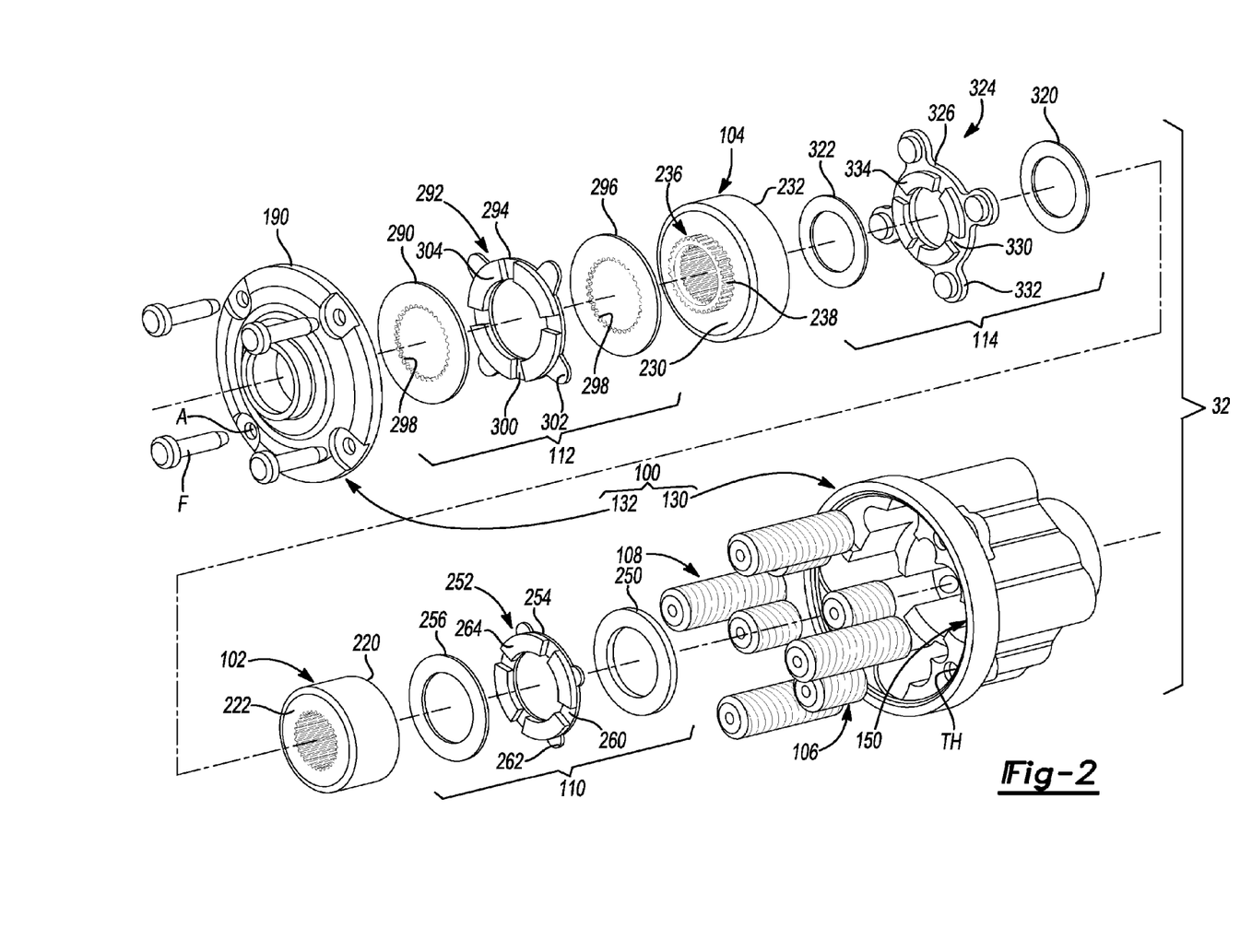
FIG. 2 is an exploded perspective view of a portion of the vehicle of FIG. 1 illustrating the center differential in more detail.
Figure 3:
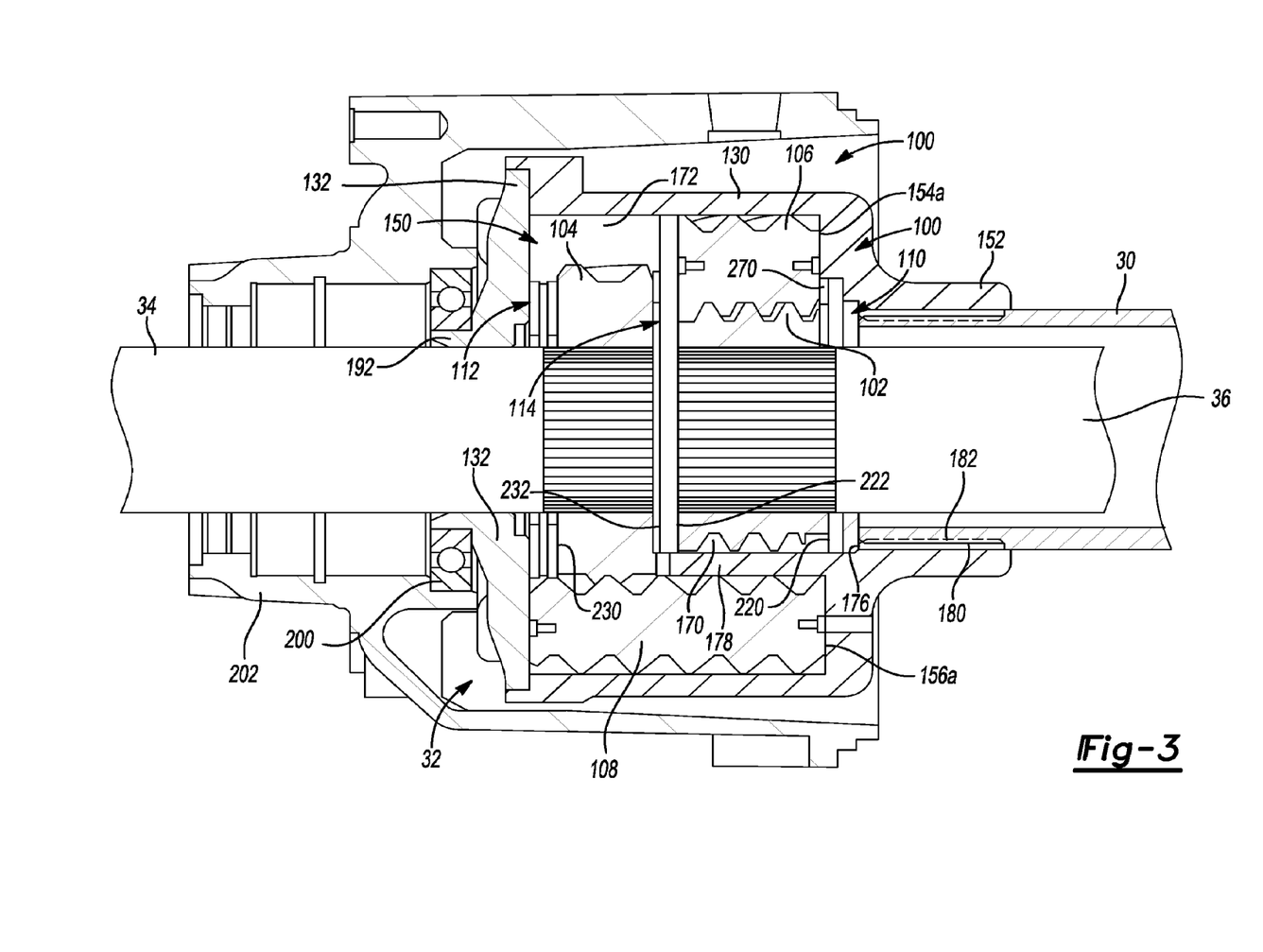
FIG. 3 is a longitudinal section view of the center differential.

With reference to FIGS. 2 and 3, the center differential 32 can include a differential case 100, first and second side gears 102 and 104, respectively, a first set of pinion gears 106, a second set of pinion gears 108, a first friction & thrust washer set 110, a second friction & thrust washer set 112 and a center friction & thrust washer set 114.

Figure 4:
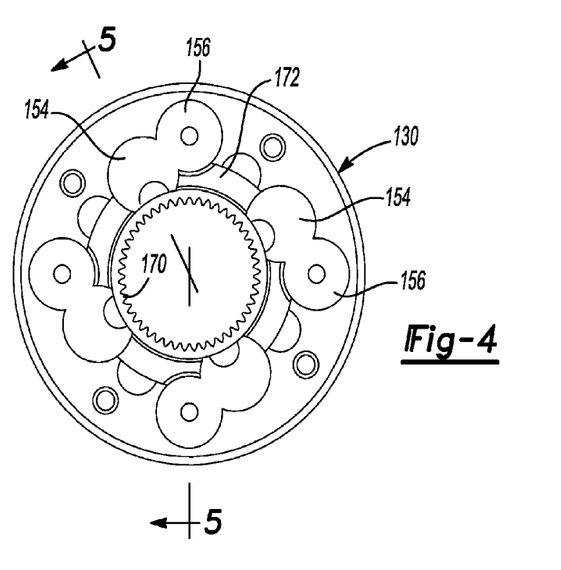
FIG. 4 is an end view of a portion of the center differential, illustrating a case member of a differential case in more detail.
Figure 5:
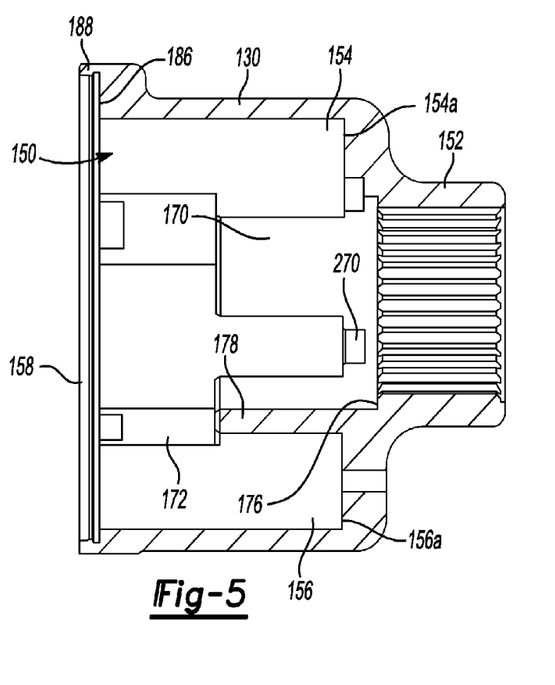
FIG. 5 is a section view taken along the line 5-5 of FIG. 4.

With reference to FIGS. 3 through 5, the differential case 100 can include a case member 130 and a cap 132. The case member 130 can define a central cavity 150, a first trunnion 152, a plurality of first pinion pockets 154, a plurality of second pinion pockets 156 and an annular pocket 158 that is disposed on a side of the case member 130 opposite the first trunnion 152.

The central cavity 150 can include a first cavity portion 170 and a second cavity portion 172 that can be disposed on a side of the first cavity portion 170 opposite the first trunnion 152. The first and second cavity portions 170 and 172 can be disposed concentric with a longitudinal (rotational) axis of the differential case 100. The first cavity portion 170 can be sized to receive the first side gear 102 and can define a first shoulder 176 and a first annular wall 178. The second cavity portion 172 can be sized to receive the second side gear 104.

The first trunnion 152 can be concentric with the rotational axis of the differential case 100 and can extend axially away from the first cavity portion 170. The first trunnion 152 can be configured to drivingly engage the input propeller shaft 30 to permit rotary power to be transmitted therebetween. In the example provided, the first trunnion 152 includes a toothed or splined interior surface 180 that matingly engages teeth or splines 182 that are formed on the input propeller shaft 30.

The first pinion pockets 154 can be formed about the central cavity 150 generally parallel to the rotational axis of the differential case 100. The first pinion pockets 154 that can terminate at a first pinion pocket shoulder 154a. Similarly, the second pinion pockets 156 can be formed about the first cavity portion 170 generally parallel to the rotational axis of the differential case 100 and can terminate at a second pinion pocket shoulder 156a. The second pinion pockets 156 can be disposed radially outwardly of the first annular wall 178 so as to intersect the second cavity portion 172 and an associated one of the first pinion pockets 154 but not to intersect the first cavity portion 170.

The annular pocket 158 can be formed in the open end of the case member 130 and can define an end shoulder 186 and an annular rim 188. The end shoulder 186 can intersect the second cavity portion 172 of the central cavity 150.

Figure 6:
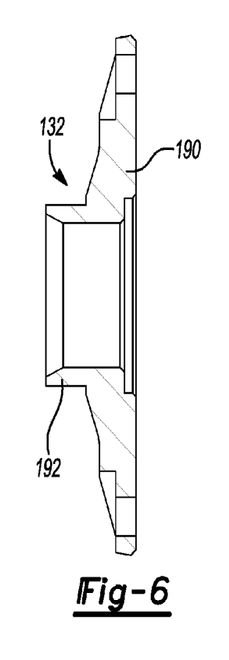
FIG. 6 is a longitudinal section view of a portion of the center differential illustrating the cap of the differential case in more detail Corresponding reference numerals indicate corresponding parts throughout the several views of the drawings.

With reference to FIGS. 3, 5 and 6, the cap 132 can include an annular flange 190 and a second trunnion 192. The annular flange 190 can be received into the annular pocket 158 in the case member 130 and seated to a desired depth, such as abutted against the end shoulder 186. Any suitable means may be employed to retain the cap 132 to the case member 130, including a threaded connection between the cap 132 and the annular rim 188, one or more welds, and/or a plurality of threaded fasteners. In the particular example provided, threaded fasteners F (FIG. 2) are received through apertures A (FIG. 2) in the cap 132 and threadably engaged to corresponding holes TH (FIG. 2) formed in the case member 130. The second trunnion 192 can be coincident with the rotational axis of the center differential 32 and can receive therethrough the rear output propeller shaft 34. If desired, a seal and/or bearing can be coupled to the cap 132 to sealingly engage and/or rotatably support the rear output propeller shaft 34 relative to the differential case 100. In the particular example provided, a bearing 200 is employed between the second trunnion 192 and an auxiliary housing 202 to support the center differential 32 for rotation within the auxiliary housing 202.

With reference to FIGS. 2 and 3, the first side gear 102 can have one or more helical teeth having a first pitch diameter and providing the first side gear 102 with a first outside diameter that is sized to be received into the first cavity portion 170 of the central cavity 150. The first side gear 102 can have generally flat outer and inner axial end faces 220 and 222, respectively (i.e., the outer and inner axial end faces 220 and 222 can be flat and perpendicular to the rotational axis of the center differential 32).

The second side gear 104 can have one or more helical teeth having a second pitch diameter and providing the second side gear 104 with a second outside diameter that is sized to be received in the second cavity portion 172 of the central cavity 150. In the particular example provided, the second pitch diameter is larger than the first pitch diameter to provide a torque split between the front and rear output propeller shafts 34 and 36 of a desired ratio. In the particular example provided the first and second pitch diameters are configured to provide a torque split ratio of 40:60 (front-to-rear). The second side gear 104 can have a generally flat inner axial end face 232, while the opposite axial side can comprise a flat outer thrust surface 230 and a coupling collar 236. The coupling collar 236 can be an annular structure that can extend axially away from the outer thrust surface 230 and can comprise a plurality of teeth or splines 238 that can extend in an axial direction away from the outer thrust surface 230.

The first set of pinion gears 106 can be helical pinion gears that are received in the first pinion pockets 154 and meshingly engaged to the first side gear 102. The second set of pinion gears 108 can be helical pinion gears that are received in the second pinion pockets 156 and meshingly engaged to the second side gear 104 and an associated one of the pinions of the first set of pinion gears 106. An outboard axial end of each of the pinions of the first set of pinion gears 106 can directly abut the differential case 100. An outboard axial end of each of the pinions of the second set of pinion gears 108 can directly abut the differential case 100. Each of the pinions of the second set of pinion gears 108 can extend away from the second side gear (104) past the center friction & thrust washer set 114.

The first friction & thrust washer set 110 can be configured to control friction between the differential case 100 and the first side gear 102. The first friction & thrust washer set 110 can be received in the first cavity portion 170 of the central cavity 150 and can comprise a first thrust washer 250, which can be abutted against the first shoulder 176 in the case member 130, a friction plate set 252 that can comprise one or more pairs of friction plates 254, and a second thrust washer 256 that can be disposed between the friction plate set 252 and the outer axial end face 220 of the first side gear 102. The first and second thrust washers 250 and 256 can be formed of hardened steel (e.g., nitrided).

In the particular example provided, the friction plate set 252 comprises a single friction plate 254 that is received between the first and second thrust washers 250 and 256 and non-rotatably coupled to the case member 130. It will be appreciated, however, that where the friction plate set 252 comprises a plurality of friction plates 254, a portion of the friction plates 254 could be non-rotatably coupled to the first side gear 102 and interleaved between others of the friction plates 254 that are non-rotatably coupled to the case member 130. Each friction plate 254 can comprise an annular body 260 and a plurality of retaining tabs 262 that can extend radially outwardly from the annular body 260. The annular body 260 can be coated on one or both axial surfaces with a suitable friction material 264. In the particular example provided, the annular body 260 and retaining tabs 262 are formed of hardened steel (e.g., nitrided) and a carbon-based friction material is bonded to both axial surfaces of the annular body 260. The retaining tabs 262 can be configured to engage the case member 130 or the first side gear 102 to inhibit relative rotation between the friction plate 254 and the differential case 100 or the first side gear 102. In the example provided, each of the retaining tabs 262 is received through an associated one of the first pinion pockets 154 and disposed within a tab recess 270 formed between the first shoulder 176 and the first pinion pocket shoulder 154a.

The second friction & thrust washer set 112 can be configured to control friction between the differential case 100 and the second side gear 104. The second friction & thrust washer set 112 can be received in the second cavity portion 172 of the central cavity 150 and can comprise a first thrust washer 290, which can be abutted against the annular flange 190 of the cap 132, a friction plate set 292, which can comprise one or more friction plates 294, and a second thrust washer 296 that can be disposed between the friction plate set 292 and the outer thrust surface 230 formed on the second side gear 104. The first and second thrust washers 290 and 296 can be formed of hardened steel (e.g., nitrided) and can be coupled to the second side gear 104 for rotation therewith. For example, each of the first and second thrust washers 290 and 296 can comprise a plurality of features that can be configured to matingly engage corresponding features formed on the second side gear 104. In the illustrated example, the first and second thrust washers 290 and 296 include internal teeth or splines 298 that are configured to meshingly engage the teeth/splines 238 formed on the coupling collar 236 of the second side gear 104. In the particular example provided, the friction plate set 292 comprises a single friction plate 294 that is received between the first and second thrust washers 290 and 296 and non-rotatably coupled to the cap 132. It will be appreciated, however, that where the friction plate set 292 comprises a plurality of friction plates 294, a portion of the friction plates 294 could be non-rotatably coupled to the second side gear 104 (e.g., via an internally toothed or splined aperture that can engage the teeth/splines 238 on the coupling collar 236) and interleaved between others of the friction plates 294 that are non-rotatably coupled to the cap 132. Each friction plate 294 can comprise an annular body 300 and a plurality of retaining tabs 302 that can extend radially outwardly from the annular body 300. The annular body 300 can be coated on one or both axial surfaces with a suitable friction material 304. In the particular example provided, the annular body 300 and retaining tabs 302 are formed of hardened steel (e.g., nitrided) and a carbon-based friction material is bonded to both axial surfaces of the annular body 300. The retaining tabs 302 can be configured to engage the differential case 100 or the second side gear 104 to inhibit relative rotation between the friction plate 294 and the differential case 100 or the second side gear 104. In the example provided, each of the retaining tabs 302 is received into an associated one of the second pinion pockets 156 and is juxtaposed with the annular flange 190 of the cap 132 and an associated one of the pinions of the second set of pinion gears 108.

The center friction & thrust washer set 114 can be configured to control friction between the first and second side gears 102 and 104. The center friction & thrust washer set 114 can be received in the central cavity 150 and can comprise a first thrust washer 320, which can be disposed adjacent the inner axial end face 222 of the first side gear 102, a second thrust washer 322, which can be disposed adjacent the axially inner surface 232 of the second side gear 104, and a friction plate set 324 that can be received between the first and second thrust washers 320 and 322. In the particular example provided, the friction plate set 324 comprises a single friction plate 326 that is non-rotatably coupled to the differential case 100, but it will be appreciated that the friction plate set 324 could comprise pairs of friction plates in which one type of friction plate is non-rotatably coupled to an associated one of the first and second side gears 102 and 104 and a second type of friction plate is non-rotatably coupled to the differential case 100. It will be appreciated that friction plates may be non-rotatably coupled to the first side gear 102 or to the second side gear 104 or that both the first and second side gears 102 and 104 may have friction plates non-rotatably coupled to them. A second type of friction plate may be non-rotatably coupled to the differential case 100 and interleaved between the first type of friction plate. In the particular example provided, however, a single friction plate 326 is employed and includes an annular body 330 and a plurality of tabs 332 that extend radially outwardly from the tabs 332. The annular body 330 and the tabs 332 can be coated on one or both axial surfaces with a suitable friction material 334. In the particular example provided, the annular body 330 and the tabs 332 are formed of hardened steel (e.g., nitrided) and a carbon-based friction material is bonded to both axial surfaces of both the annular body 330 and the tabs 332. The tabs 332 can be configured to engage the differential case 100 to inhibit relative rotation between the friction plate 326 and the differential case 100. In the example provided, each of the tabs 332 is received into an associated one of the first pinion pockets 154 and is abutted against an inboard end of a respective one of the pinions of the first set of pinion gears 106 on a side opposite the first pinion pocket shoulder 154a.

It will be appreciated that the components of the differential case 100 can be sized and constructed such that they can preload the first, second and center friction & thrust washer sets 110, 112 and 114 to a desired load. It will also be appreciated that while the first and second friction & thrust washer sets 110 and 112 have been described above and illustrated in the accompanying drawings as including a friction plate and thrust washers, one or more of the first and second friction & thrust washer sets 110 and 112 could be configured with a single or sole plate-like component or a pair of plate-like components. In the case of a single or sole plate-like component, the component can serve as a thrust washer and may be configured with a predetermined set of tribological properties to aid in controlling friction between the differential case 100 and an associated one of the side gears. In the case of a pair of plate-like components, one or both of the pair could serve as a thrust washer, and one or both of the pair may be configured with a predetermined set of tribological properties to aid in controlling friction between the differential case 100 and an associated one of the side gears.

During operation of the vehicle 10 (FIG. 1) in a forward direction, rotary power is input to the center differential 32 via the input propeller shaft 30 and output through the front output propeller shaft 36 and rear output propeller shaft 34. When the rear and front wheels 60r and 60f (FIG. 1) do not slip, the first and second side gears 102 and 104 do not rotate relative to the differential case 100 and as such, rotary power is transmitted between the rear and front output propeller shafts 34 and 36 according to the predetermined torque split.

When rotary power is provided by the input propeller shaft 30 to the center differential 32 to propel the vehicle 10 (FIG. 1) in a forward direction and the rear wheels 60r (FIG. 1) slip, the first and second side gears 102 and 104 thrust axially apart from one another and compress the first and second friction & thrust washer sets 110 and 112 against the differential case 100. Moreover, the pinions of the set of first pinions 106 will shift axially toward and engage the friction material 334 that is disposed on the tabs 332 of the friction plate 326 associated with the center friction & thrust washer set 114 to thereby provide the center differential 32 with a first TDR value. It will be appreciated that the TDR torque can be calculated utilizing the following formula.

$$TDR = (T_{SI} \times Bias \times TS) \div 100\%$$

where TDR is the TDR torque; $T_{SI}$ is the slip input torque, Bias is the amount of bias that is desired between the front and rear axles, and TS is a ratio of torque supplied to slipping axle divided by torque supplied to non-slipping axle. Assuming a slip input torque (transmitted from the rear output propeller shaft 34 to the center differential 32) of $T_{SI}$=100 Nm, a Bias of 2.5 and a torque split of 1.5 (i.e., 60% rear slipping axle÷40% front non-slipping axle in the example provided) provides a TDR measurement of 1.67 Nm.

In situations where the vehicle 10 (FIG. 1) is coasting and the rear wheels 60r (FIG. 1) slip, the first and second side gears 102 and 104 thrust inwardly and frictionally engage the friction material 334 on the body 330 of the friction plate 326 with the center friction & thrust washer set 114 to thereby provide the center differential 32 with a second TDR measurement. Assuming a slip input torque (transmitted from the rear output propeller shaft 34 to the center differential 32) of $T_{SI}$=100 Nm, a Bias of 2.4 and a torque split ratio of TS=1.5 provides a TDR measurement of 1.60 Nm.

When rotary power is provided by the input propeller shaft 30 to the center differential 32 to propel the vehicle 10 (FIG. 1) in a forward direction and the front wheels 60f (FIG. 1) slip, the first and second side gears 102 and 104 thrust axially apart from one another and compress the first and second friction & thrust washer sets 110 and 112 against the differential case 100. Moreover, the pinions of the set of first pinions 106 will shift axially toward and engage the friction material 334 that is disposed on the tabs 332 of the friction plate 326 associated with the center friction & thrust washer set 114 to thereby provide the center differential 32 with a third TDR value. Assuming a slip input torque (transmitted from the front output propeller shaft 36 to the center differential 32) of $T_{SI}$=100 Nm, a Bias of 2.5 and a torque split ratio of 0.667 (i.e., 40% front slipping axle÷60% rear non-slipping axle in the example provided) provides a TDR measurement of 3.75 Nm.

In situations where the vehicle 10 (FIG. 1) is coasting and the rear wheels 60r (FIG. 1) slip, the first and second side gears 102 and 104 thrust inwardly and frictionally engage the friction material 334 on the body 330 of the friction plate 326 with the center friction & thrust washer set 114 to thereby provide the center differential 32 with a second TDR measurement. Assuming a slip input torque (transmitted from the rear output propeller shaft 34 to the center differential 32) of $T_{SI}$=100 Nm, a bias of 2.4 and a torque split ratio (rear/front) of 0.667 (i.e., 40%÷60% in the example provided) provides a TDR measurement of 3.60 Nm.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A differential comprising:
    a differential case;
    first and second side gears received in the differential case;
    a plurality of first pinions received in the differential case and meshingly engaged with the first side gear; and
    a plurality of second pinions received in the differential case and meshingly engaged with the second side gear, each of the plurality of second pinions meshingly engaging an associated one of the first pinions;
    wherein the first side gear has a pitch diameter that is smaller than a pitch diameter of the second side gear;
    wherein the differential further comprises a center friction and thrust washer set received between the first and second side gears, the center friction and thrust washer set abutting an inboard axial end of each of the plurality of first pinions; wherein each of the plurality of second pinions extends axially away from the second side gear past the center friction and thrust washer set;

wherein the differential includes first and second friction and thrust washer sets, the first friction and thrust washer set being configured to control friction between the differential case and the first side gear, the second friction and thrust washer set being configured to control friction between the differential case and the second side gear;

wherein the second friction and thrust washer set comprises a first friction control element and at least one second friction control element, the first friction control element being coupled to the differential case for rotation therewith and the at least one second friction control element being coupled to the second side gear for rotation therewith; and wherein an outboard axial end of each of the plurality of first pinions and an outboard axial end of each of the plurality of second pinions directly contact the differential case.

2. A differential comprising:
a differential case;
first and second side gears received in the differential case;
a plurality of first pinions received in the differential case and meshingly engaged with the first side gear; and
a plurality of second pinions received in the differential case and meshingly engaged with the second side gear, each of the plurality of second pinions meshingly engaging an associated one of the first pinions;
wherein the first side gear has a pitch diameter that is smaller than a pitch diameter of the second side gear;
wherein the differential further comprises a center friction and thrust washer set received between the first and second side gears, the center friction and thrust washer set abutting an inboard axial end of each of the plurality of first pinions; and
wherein each of the plurality of second pinions extends axially away from the second side gear past the center friction and thrust washer set.

3. The differential of claim 2, further comprising a first friction and thrust washer set that is received between the differential case and the first side gear.

4. The differential of claim 2, further comprising a second friction and thrust washer set that is received between the differential case and the second side gear.

5. The differential of claim 2, wherein the differential case comprises a first trunnion having a toothed or splined interior surface that is adapted to engage teeth or splines that are formed on an input shaft.

6. The differential of claim 2, wherein the differential case comprises a second trunnion, and wherein the differential further comprises a support and a bearing that supports the second trunnion for rotation relative to the support.

7. The differential of claim 2, wherein the center friction and thrust washer set comprises a friction plate that is coupled to the differential case.

8. The differential of claim 7, wherein the friction plate has an annular body and a plurality of retaining tabs.

9. The differential of claim 7, wherein the differential case defines a plurality of pinion pockets, each of the plurality of first pinions being received into an associated one of the plurality of pinion pockets, and wherein each of the plurality of retaining tabs is received into a corresponding one of the plurality of pinion pockets.

10. The differential of claim 7, wherein the friction plate comprises a hardened steel plate and friction material that is bonded to the hardened steel plate.

11. A differential comprising:
a differential case;
first and second side gears received in the differential case;
a plurality of first pinions received in the differential case and meshingly engaged with the first side gear; and
a plurality of second pinions received in the differential case and meshingly engaged with the second side gear, each of the plurality of second pinions meshingly engaging an associated one of the first pinions;
wherein the second side gear has a pitch diameter that is smaller than a pitch diameter of the first side gear; and
wherein the differential further comprises a first friction and thrust washer set that comprises a first friction control element and at least one second friction control element, the first friction control element being coupled to the differential case for rotation therewith and the at least one second friction control element being coupled to the first side gear for rotation therewith.

12. The differential of claim 11, wherein the differential case includes a case member and a cap and wherein the cap is assembled to the case member such that a preload force is exerted through the first friction and thrust washer sets.

13. The differential of claim 11, further comprising a center friction and thrust washer set received between the first and second side gears.

14. The differential of claim 13, wherein the differential case defines a plurality of pinion pockets, wherein each of the second pinions is received into an associated one of the plurality of pinion, and wherein the center friction and thrust washer set includes a center friction plate having a plurality of retaining tabs, each of the plurality of retaining tabs being received into a corresponding one of the pinion pockets.

15. The differential of claim 11, wherein the differential further comprises a second friction and thrust washer set that is disposed between the second side gear and the differential case.

16. The differential of claim 15, wherein the second friction and thrust washer set comprises a second friction plate that is coupled to the differential case for rotation therewith.

17. The differential of claim 16, wherein the second friction and thrust washer set further includes at least one thrust washer in abutment with the friction plate.

18. A differential comprising:
a differential case;
first and second side gears received in the differential case;
a plurality of first pinions received in the differential case and meshingly engaged with the first side gear;
a plurality of second pinions received in the differential case and meshingly engaged with the second side gear, each of the plurality of second pinions meshingly engaging an associated one of the first pinions; and
a center friction and thrust washer set received between the first and second side gears;
wherein the differential includes first and second friction and thrust washer sets, the first friction and thrust washer set being configured to control friction between the differential case and the first side gear, the second friction and thrust washer set being configured to control friction between the differential case and the second side gear; and
wherein an outboard axial end of each of the plurality of first pinions and an outboard axial end of each of the plurality of second pinions directly contact the differential case;

wherein the differential case defines a plurality of pinion pockets, wherein each of the second pinions is received into an associated one of the plurality of pinion pockets, and wherein the center friction and thrust washer set includes a center friction plate having a plurality of retaining tabs, each of the plurality of retaining tabs being received into a corresponding one of the pinion pockets.

19. The differential of claim 18, wherein the second friction and thrust washer set comprises a second friction plate that is coupled to the differential case for rotation therewith.

* * * * *